July 5, 1927.

C. W. OSTROM 1,634,553

TIRE SIGNAL

Filed Dec. 4, 1926

Inventor
Cameron W. Ostrom
Herbert E. Smith

By

Attorney

Patented July 5, 1927.

1,634,553

UNITED STATES PATENT OFFICE.

CAMERON W. OSTROM, OF BREWSTER, WASHINGTON.

TIRE SIGNAL.

Application filed December 4, 1926. Serial No. 152,592.

My present invention relates to an improved tire signal of the audible type, adapted for use with the wheels of automotive vehicles to indicate a deflated condition of the pneumatic tire.

While the signal of my invention is adapted for various uses, it is particularly designed for use in connection with low pressure or balloon tires. As is well known to those familiar with existing conditions with regard to this type of tire, if the pressure in the low pressure or balloon tire falls below the normal low pressure, such deflation causes a deformation of the tire. Under such conditions the tire is subjected to excessive wear, and is injured and damaged as the wheel travels over rough roads. The primary object of my invention is the provision of an audible signal carried by the wheel and normally inoperative, but operative as the wheel revolves, by movement of the tire, when the latter is deflated below normal pressure, to indicate the lowered pressure condition.

My invention consists in certain novel combinations and arrangements of parts as will hereinafter be more fully set forth and claimed. In the accompanying drawings I have illustrated one complete example of the physical embodiment of my invention wherein the parts are combined and arranged according to the best mode I have thus far devised for the practical application of the principles of my invention.

Figure 1:
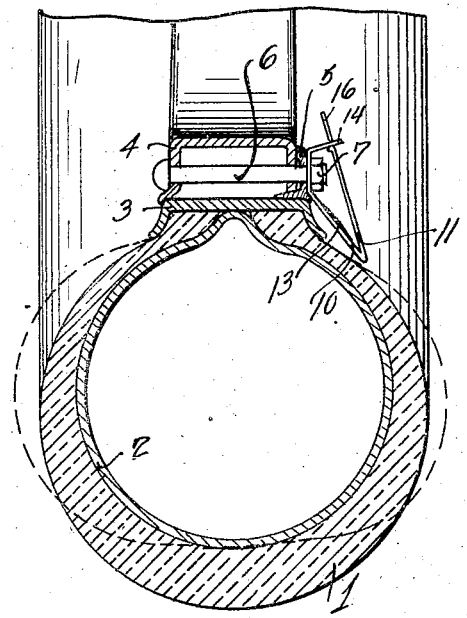
Figure 1 is a sectional view through a pneumatic tire having the signal of my invention adapted thereto, and showing by dotted lines the position of the tire when it is partially deflated, or below its normal pressure.
Figure 2:
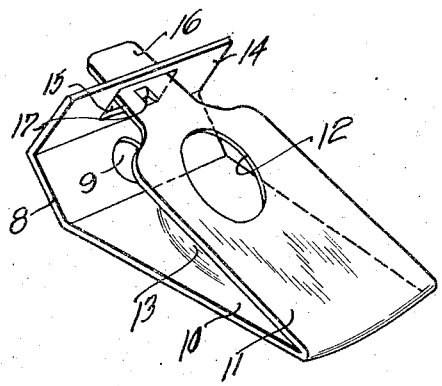
Figure 2 is a perspective view of the signal device, detached.
Figure 3:
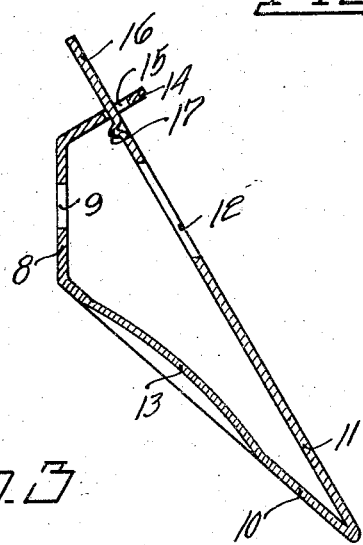
Figure 3 is a sectional detail view of the signal device.

In order that the general arrangement of parts and the utility of the signal may readily be understood I have shown in Figure 1 a conventional form of low pressure or balloon tire as 1, which normally retains sufficient air pressure to support the vehicle and yet maintain its proper form. If the pressure falls below the normal the tire becomes deformed and bulges, laterally, as indicated by dotted lines in Figure 1. When this condition of deformation exists in either a standard type or a balloon type of tire and wheel equipped with the signal of my invention, the latter becomes operative as the wheel revolves, the signal being sounded as the adjacent portion of the tire is bulged as it contacts with the roadway or ground.

The tire is provided with the usual inner tube 2, and the usual metal rim is indicated at 3, with the felly 4, retaining ring 5, retaining bolt 6, and nut 7 of the demountable tire.

The signal device is fashioned in a somewhat V-shape clip for attachement to the wheel and co-action with the deflated tire, and may be made up of silver steel or other suitable tempered metal that is resilient and possesses resounding, ringing, or resonant qualities.

The signal device is fashioned with an attaching plate 8 having a bolt hole 9 therein to fit around the threaded end of the rim bolt 6, and as seen in Figure 1 the nut 7 of the rim bolt is utilized for clamping the signal device to the felly of the wheel.

Two angularly disposed flat plates 10 and 11 provide the wedge or V-shape of the signal, the latter being provided with a hole 12 to accommodate a wrench that may be used to turn the nut 7 when clamping the signal device on the wheel. The attaching plate is located in such position as to insure a downward and lateral projection for the two plates forming the wedge shaped body of the signal and this wedge or V-shaped body projects over the upper face of the wall of the tire in order that the latter may contact with the end of the V-shaped body when the tire is partially deflated and deformed.

The plate 10 is fashioned with a concavoconvex portion 13 stamped therein, and this portion causes a click-clack sound when the plate 10 is flexible by impact from the bulged part of the tire, thus sounding the click-clack with each revolution of the wheel.

A second audible signal is also sounded in conjunction with the click-clack to give warning of the deflated condition of the tire. For this purpose the attaching plate is provided with an angular flange 14 having a slot 15 therein, and the plate 11 is formed with a reduced extension of tongue 16 passed through the slot. On its under side the tongue is fashioned with an upset lug or abutment 17, normally positioned below the under face of the flange 14.

As the plate 10 is flexed, and thus shortened, the tongue 16 is caused to move in the slot 15, and due to the resiliency of the metal plate 11 in its relation to the plate 10, the lug or tappet 17 is caused to snap across the adjacent wall of the slot 15 making a snappy noise or clack with each revolution of the deflated or partially deflated wheel.

It will be apparent that the signal device may with facility be applied to the wheel and requires only the use of a wrench or similar tool for manipulating the clamp nut which holds the signal in correct position. Each wheel of the vehicle is equipped with one or more of the signals, and as they are comparatively simple in construction and fashioned of a single piece of material it will be apparent that they can be manufactured at comparatively low cost of production.

Having thus fully described my invention, what I claim as new and desire to secure by Letters Patent is—

1. A signal device for the purpose described comprising an attaching plate and a slotted flange thereon, a flexible plate, a plate carried by the flexible plate and adapted to have a reciprocal movement with relation to the slotted flange, and a tappet on the latter plate adapted to co-act with a wall of the slotted flange.

2. A deflation signal comprising an attaching plate and a flange rigid therewith having a slot, a V-shaped body integral with the attaching plate and comprising a plate adapted to be flexed, a snap-plate forming part of the V-shaped body and adapted to reciprocate as the other plate is flexed, and a tappet on the snap plate adapted to co-act with a wall of the slot.

3. A deflation signal comprising a single piece of resilient metal and formed with an attaching plate having a bolt hole therein, an angularly disposed flange having a guide slot and rigid with said plate, a V-shaped body integral with the attaching plate and including a plate adapted to be flexed, a snap plate integral with the latter plate, a reduced extension on the snap plate adapted to reciprocate in the slot, and a lug on said extension adapted to act as a tappet in co-action with a wall of the slot.

In testimony whereof I affix my signature.

CAMERON W. OSTROM.